Figure 4:
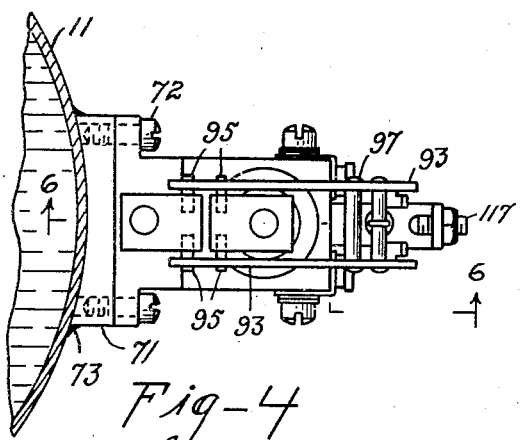

March 19, 1946.  C. M. OSTERHELD  2,397,039
WATER HEATING SYSTEM
Filed Jan. 1, 1944  2 Sheets-Sheet 1
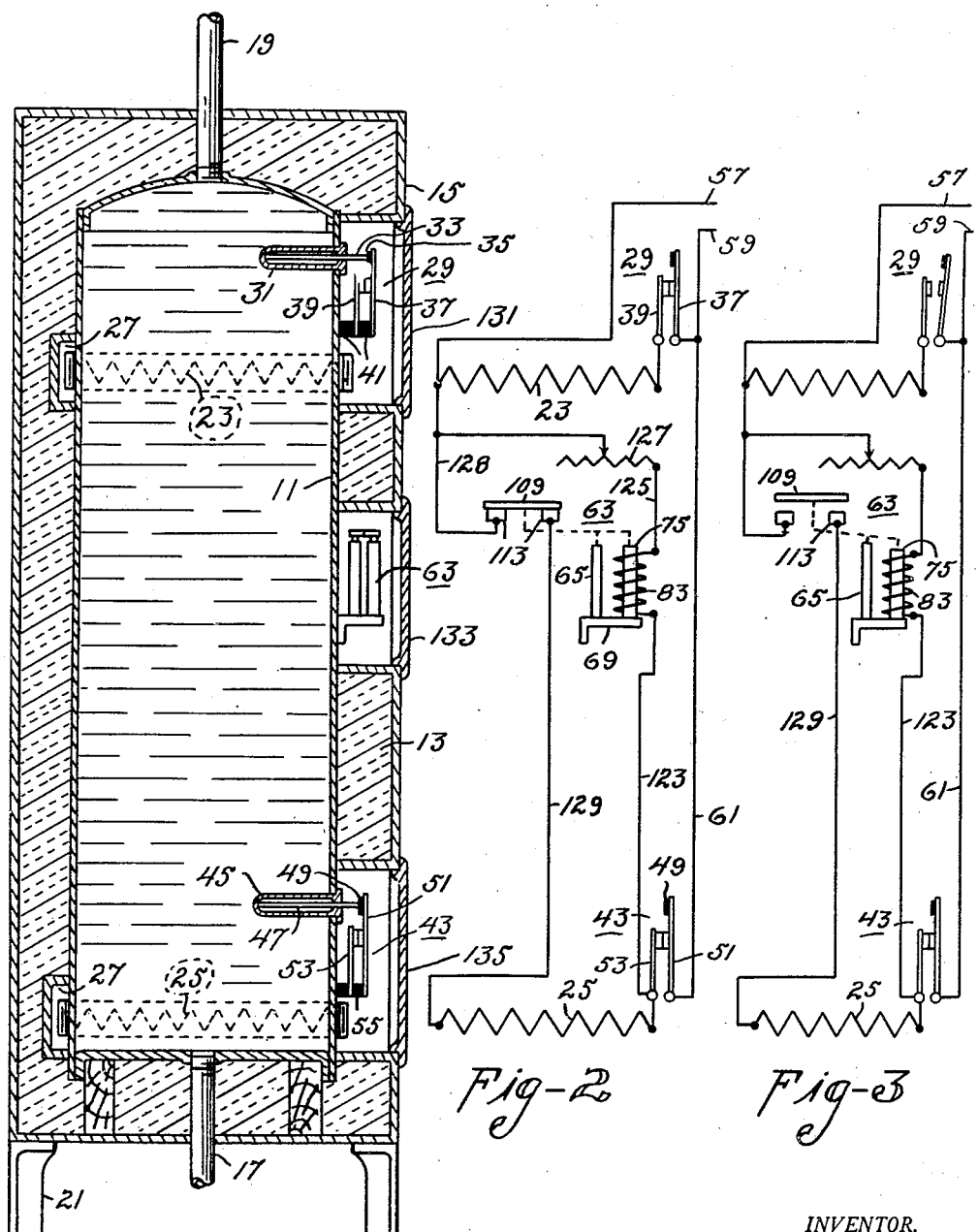
INVENTOR.
CLARK M. OSTERHELD
BY
ATTORNEY March 19, 1946. C. M. OSTERHELD 2,397,039
WATER HEATING SYSTEM
Filed Jan. 1, 1944 2 Sheets-Sheet 2

INVENTOR.
CLARK M. OSTERHELD
BY
ATTORNEY

Patented Mar. 19, 1946

2,397,039

UNITED STATES PATENT OFFICE 2,397,039

WATER HEATING SYSTEM

Clark M. Osterheld, Stoughton, Wis., assignor to McGraw Electric Company, Elgin, Ill., a corporation of Delaware Application January 1, 1944, Serial No. 516,694

14 Claims. (Cl. 219—39)

My invention relates to electric heating and particularly to heater control systems for hot water tanks.

An object of my invention is to provide a heater control system for a hot water tank having an upper and a lower heater to cause selective energization thereof with and without a timed delay period for one of said heaters in accordance with the amount of hot water withdrawn from the tank.

Another object of my invention is to provide a control system that shall cause energization of the lower heater only with a time delay period in case only a relatively small amount of hot water has been withdrawn from the tank, cause energization immediately of only the lower heater in case a predetermined larger amount, but less than the total of hot water has been withdrawn from the tank and that shall cause energization of both heaters in case all of the hot water in the tank has been withdrawn.

Other objects of my invention will either be apparent from a description of a system embodying my invention or will be pointed out in the course of such description and set forth particularly in the appended claims.

Figure 5:
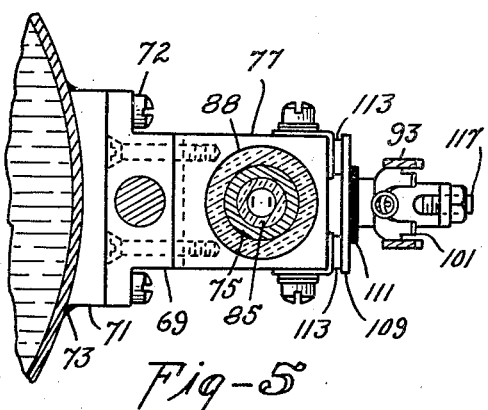
Figure 6:
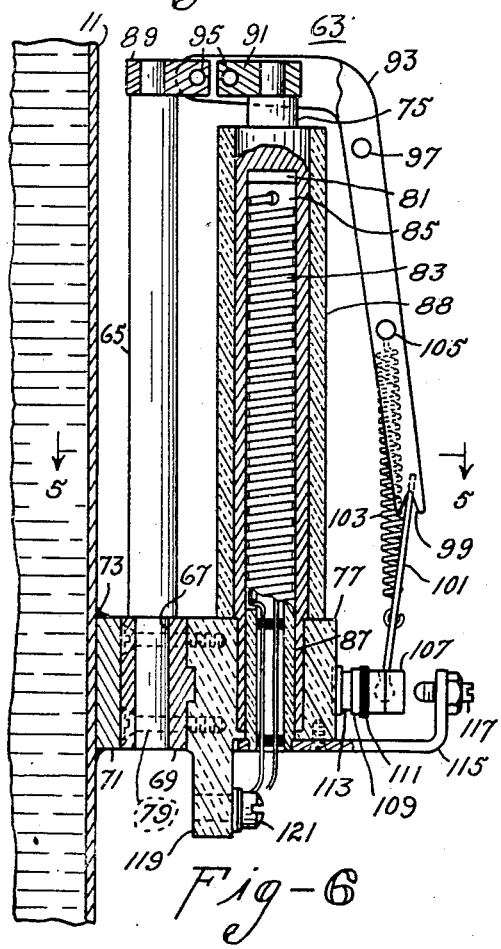
Figure 7:
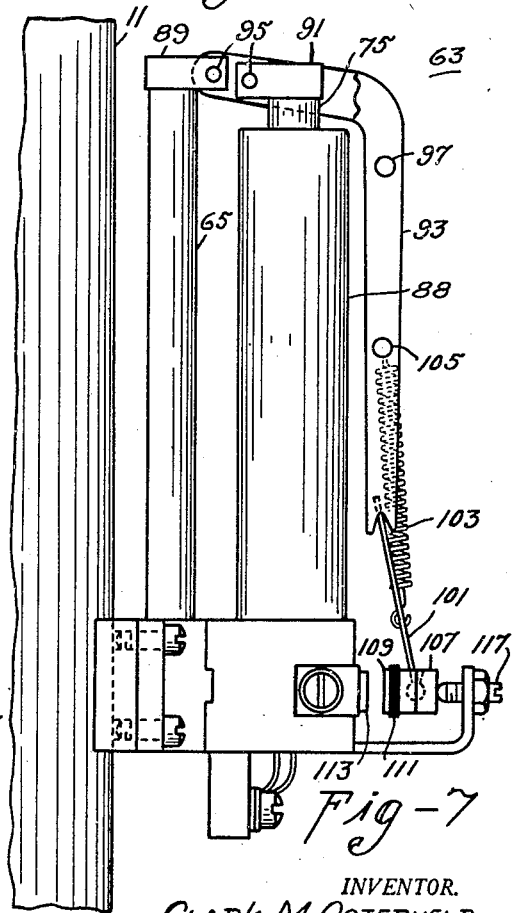

In the drawings:

Figure 1 is a vertical sectional view of a hot water tank showing relative positions of the heaters, the thermal heater control switch and of a thermal retarder switch unit, Fig. 2 is a diagram of connections showing the positions of the contacts when the tank contains cold water, Fig. 3 is a diagram of connections similar to Fig. 2 except that the position of the contacts are as when the upper and the center portion of the tank contains hot water and the bottom portion contains cold water and at the start of the retardation period, Fig. 4 is a top plan view of the parts of the thermal retarder switch unit shown in Fig. 6, Fig. 5 is a horizontal sectional view on the line 5—5 of Fig. 6 with the contacts in position as in Fig. 2, Fig. 6 is a vertical sectional view on the line 6—6 of Fig. 4 of the thermal retarder switch unit showing the contacts in the position as in Fig. 2, and, Fig. 7 is a vertical side view of Fig. 6 except that the contacts are shown in position as in Fig. 3.

Referring first of all to Fig. 1 of the drawings I have there shown a hot water tank 11 of the usual kind provided in homes and which is covered with a mass 13 of heat insulation held in position thereon by an outer casing 15. The tank 11 has a lower cold water inlet pipe 17 and an upper hot water outlet pipe 19. I provide a plurality of supports 21 all in a manner well known in the art.

I provide an upper electric heater 23 as well as a lower electric heater 25 and may bolt or secure these heaters around the outside of the tank, locating them in a tunnel member 27 all in a manner well known in the art.

I provide a thermal heater control switch 29 for the upper heater 23 and have illustrated this as comprising a tube 31 having a closed inner end and having its outer end secured in water-tight connection with the wall of the tank 11. I provide an expansion rod 33 in the tube 31 which is adapted to engage a lug 35 secured to the free or movable end of a resilient contact arm 37 to cause a contact on arm 37 to be engaged with and be disengaged from a cooperating contact on a substantially rigid contact arm 39. I have illustrated a support means for the two arms 37 and 39 as including a plurality of blocks 41 of suitable electric-insulating material. I may here point out that I do not desire to be limited to the specific construction of thermal heater control switch shown and above described by me but may use any other thermal heater control switch effective for the same purpose. The contact arms 37 and 39 will be in engagement with each other when tube 31 is subject to cold water.

I provide a lower heater control switch 43 which is subject to tank-water temperature at the lower end portion of the tank and I have illustrated this as comprising a tube 45 having a closed inner end and having its outer end in water-tight connection with the tank through an opening therein. I provide an expansion rod 47 which is adapted to engage a lug 49 of electric-insulating material secured to the outer or free end of a resilient contact arm 51 having a contact thereon which is adapted to be engaged with and be disengaged from a cooperating contact member on a rigid contact arm 53, which two contact arms may be suitably supported as by blocks 55 of electric-insulating material. Here again I have merely illustrated one form of thermal heater control switch subject to the temperature of the tank water and adapted to be in circuit closing position when subject to cold water having a temperature on the order of 70° F. and to be in open position when subject to hot water having a temperature on the order of 150° F.

I provide a pair of supply circuit conductors 57 and 59 and connect one conductor 57 to one terminal of the upper heater 23, the other terminal of this heater being connected to contact arm 39. The other contact arm 37 of thermal heater control switch 29 is connected to the second supply circuit conductor 59.

The supply circuit conductor 59 is connected by a conductor 61 to the resilient contact arm 51 of the lower thermal heater control switch 43. The rigid arm 53 is connected to one terminal of the lower heater 25, the other terminal whereof is connected by a conductor 129 to one terminal 113 of the thermal retarder unit.

I provide also a thermal retarder switch unit designated generally by the numeral 63, the details of which are shown in Figs. 4 to 7 inclusive. The thermal retarder switch unit 63 includes a first expansion rod 65 which has a relatively high thermal expansivity with increase of temperature. The lower reduced end portion 67 of rod 65 is adapted to fit into an aperture in a supporting block 69 which is adapted to be secured against the outer face of a block 71 of high heat conductivity by screws 72. Block 71 may be secured against the outer surface of the tank as by its inner surface which is curved to have surface engagement over the entire inner surface of block 71. This block 71 may be secured as by welding-seams 73 to the outer surface of the tank 11.

I provide a second expansion rod 75 which is made of a metal or an alloy having lesser thermal expansivity than does the rod 65. To support the rod 75 I provide a block 77 of thermal or heat-insulating material which may be supported by block 69 being secured thereto as by machine screws 79. The second expansion rod 75 has a bore 81 therein which is adapted to receive a low wattage heating element 83 which has been shown generally or schematically only as being supported on a rod 85 of a suitable electric-insulating material. The lower end portion 87 of the second expansion rod 75 has a slightly reduced diameter adapted to fit into an opening in block 77. The second expansion rod 75 is preferably surrounded by a tubular cover 88 of heat-insulating material to make the second rod less sensitive to the temperature of the surrounding air, to enable the use of a small wattage heating coil and to prevent the other parts of the thermal retarder from being affected by heat from the heating coil.

The upper end of the first expansion rod 65 has fixedly mounted thereon a short arm 89 while the second rod 75 has fixedly mounted thereon an arm 91, these two bars extending toward each other and adapted to pivotally support a toggle arm 93 which may be made of substantially L-shape and may comprise two parts as will be noted particularly from Fig. 4 of the drawings. I provide a plurality of pivot pins 95 in the respective arms 89 and 91 in order to pivotally support the toggle arm 93. In order to hold the two arms of member 93 in proper operative positions relatively to each other, I may provide a cross rod 97 intermediate the ends thereof.

The lower end portions of the two arms of toggle arm 93 may be provided with a recessed end portion 99 which is adapted to receive the upper end of a second toggle arm 101. An over center spring 103 has the ends thereof connected to the two toggle arms intermediate their respective ends, the upper end of spring 103 being connected to a cross bar 105 while the lower end is connected to a part of toggle arm 101.

I provide a cross bar 107 flexibly secured to the lower end of lower toggle arm 101 and mount a contact bridging member 109 thereon and insulated therefrom by a block 111 of a suitable electric-insulating material.

I provide a pair of contact members 113 on the front surface of block 77 of electric-insulating material and I further provide a stop member including a bracket 115 secured to a block 77 and having an adjustable stop screw 117 thereon.

Block 77 is provided with an integral dependent portion 119 having terminals 121 thereon to which conductors of the system as well as the ends of resistor 83 may be connected.

Referring now to Figs. 2 and 3 of the drawings I have there shown a diagram of the electric connections and it will be noted that rigid contact arm 53 to which one terminal of the lower heater 25 is connected, is connected by a conductor 123 to one terminal of the heating coil 83. The other terminal of heating coil 83 is connected by a conductor 125 to one terminal of an adjustable rheostat 127, the other terminal whereof is connected to a conductor 128 connecting one terminal of the upper heater 23 to one of the contact terminals 113. The other terminal 113 is connected by a conductor 129 to the other terminal of the lower heater 25. I may here point out that the Figs. 2 and 3 show schematically only the operation and the connections of the two expansion rods 65 and 75 to the contact bridging member 109.

Referring more particularly to Fig. 2 of the drawings the positions of the three thermally-actuable heater control switches are shown as those occupied thereby when the tank is first filled with cold water or when the tank is full of cold water because of the use of substantially all of the hot water in the tank. The upper thermal heater control switch 29 which is connected to control the upper heater 23 will then be in closed position and since it is understood that supply circuit conductors 57 and 59 are energized at all times, current will traverse the upper heater 23 to heat at least a small quantity of water in the upper portion of the tank to have the same available for use within a relatively short time, say on the order of one or several hours.

The thermal retarder switch unit shown in Figs. 4 to 7 inclusive is also in circuit closing position since the first expansion rod 65 is subject to the temperature of cold water in the tank hence its length is relatively short and may be substantially as long as the second expansion rod 75 which is subject to room temperature or a temperature of 70° F.

The lower thermal heater control switch 43 is also in circuit closing position since rod 47 is subject to the temperature of cold water in the lower part of the tank. Inspection of the diagrams of connections shown in Figs. 2 and 3 will indicate that the lower heater 25 is controlled jointly by the thermal retarder switch unit 63 and by the lower thermal heater control switch 43, these two switches being connected in series electric circuit relatively to each other and to the lower heater 25. Energization of the lower heater 25 is therefore effected and causes heating up of the water in the lower and intermediate portions of the tank.

Since the lower thermal heater control switch 43 is in closed position an electric current will traverse the auxiliary heater 83 constituting a part of the thermal retarder switch unit, the amount of this current being dependent upon the adjustment of the rheostat 127. As illustrative only I may make the value of this current such, at least at the start of use of the system embodying my invention, that the second expansion rod 75 will have been heated to its maximum operating temperature, which may be on the order of 300° F., whereby to cause its length to increase to substantially that of the first high expansion rod 65, when the latter is subject to the temperature of hot water. However, I may say that the time required for the second rod 75 to expand may be made on the order of four or six hours, although I do not desire to be limited to these particular lengths of time.

Let it be assumed that the upper end portion of the tank has been filled with hot water by reason of the energization of the upper heater 23 and that say at the end of one or several hours, the thermal heater control switch 29 has opened to interrupt energization of the upper heater 23. If now the thermal retarder switch unit 63 is still in closed position, energization of the lower heater 25 will continue with heating up of the water and a gradual lowering of the lower surface of the hot water until the thermal retarder is subject to the temperature of hot water, whereupon the parts of the thermal retarder switch unit will move into the positions shown in Fig. 3 of the drawings with consequent interruption of the energization of the lower heater 25.

Energization of the heater 83 will, however, continue until the second expansion rod 75 has increased its length to such an extent that the switch will again move, with a snap action, into the position shown in Fig. 2 of the drawings so that reenergization of the lower heater will take place and will continue until substantially all of the water in the tank has been heated to a predetermined temperature which as has hereinbefore been stated may be on the order of 150° F. When this occurs the lower thermal heater control switch 43 will be moved into open position and energization of the lower heater 25 will be interrupted.

Let it now be assumed that a small amount of hot water is withdrawn from the tank so that the lower thermal heater control switch 43 is subject to cold water. This will cause closure of the lower thermal heater control switch and resultant energization of the heating coil 83 of the thermal retarder switch unit. When a sufficient length of time has elapsed to cause the energized coil 83 to cause expansion of the second expansion rod 75 sufficiently to cause movement of the contact bridging member 109 from the position shown in Fig. 3 of the drawings to the position shown in Fig. 2 of the drawings, energization of the lower heater 25 will again be effected and heating of the water in the lower portion of the tank 11 will occur. When the lower thermal switch 43 is subject to the temperature of hot water it will open to interrupt energization of the lower heater 25.

Let it now be assumed that a relatively large amount of hot water has been withdrawn from the tank, so much that the thermal retarder switch unit is subject to cold water. If and when this occurs the inner expansion rod 65 of the thermal retarder will contract sufficiently to cause movement of the contact bridging member 109 into engagement with contact terminals 113 and since the lower thermal switch 43 is in closed position, energization of the lower heater 25 will occur.

If substantially all of the hot water in the tank is used, so that the upper thermal control switch 29 is also subject to cold water, both the lower and the upper heater will be simultaneously energized, the same sequence of operations being gone through with as was hereinbefore described as occurring when the tank is first filled with cold water.

Further details of the thermal retarder switch unit are disclosed and claimed in my co-pending application S. N. 511,387, filed November 22, 1943, and assigned to the same assignee as is the present application.

The system of control for domestic hot water tank heaters therefore provides a control system which is effective to cause energization of the lower heater on such tank immediately in case the thermal retarder switch unit which is preferably located intermediate the ends of the tank is subject to cold water and which will cause energization of the lower heater with a predetermined but adjustable time period of delay in case a lesser quantity of hot water has been withdrawn from the tank.

I may provide a cover 131 for the upper thermal heater control switch, a cover 133 for the thermal retarder switch unit and a cover 135 for the lower thermal heater control switch, all of which switches may be located in openings provided therefor in the mass of heat-insulating material 13.

Various modifications may be made in the system embodying my invention without departing from the spirit and scope thereof and all such modifications clearly covered by the appended claims shall be considered a part thereof.

I claim as my invention:

1. In a water heating system for a hot water tank having a top and a bottom electric heater, a thermally-actuable control switch for the respective heaters subject to tank water temperature at the top and at the bottom of the tank, a thermal retarder unit comprising a pair of dissimilarly thermally-responsive elements subject to tank water temperature intermediate the ends of the tank and a third control switch for said bottom heater actuable by said thermal retarder, all of said control switches being closed when the tank is full of cold water.

2. In a water heating system for a hot water tank having a top and a bottom electric heater, a thermally-actuable control switch for the respective heaters subject to tank water temperature at the top and at the bottom of the tank, a thermal retarder unit comprising a pair of dissimilarly thermally-responsive elements subject to tank water temperature intermediate the ends of the tank and a third control switch for said bottom heater actuable by said thermal retarder, all of said control switches being closed when the tank is full of cold water and said control switch for the top heater being open when said top heater control switch is subject to hot water.

3. In a water heating system for a hot water tank having a top and a bottom electric heater, a thermally-actuable control switch for the respective heaters subject to tank water temperature at the top and at the bottom of the tank, a thermal retarder unit comprising a pair of dissimilarly thermally-responsive elements subject to tank water temperature intermediate the ends of the tank and a third control switch for said bottom heater actuable by said thermal retarder, all of said control switches being closed when the tank is full of cold water and both said thermal control switches for the top and the bottom heater being open to deenergize both said heaters when the tank is full of hot water.

4. In a water heating system for a hot water tank having a top and a bottom electric heater, a thermally-actuable control switch for the respective heaters subject to tank water temperature at the top and at the bottom of the tank, a thermal retarder unit subject to tank water temperature intermediate the ends of the tank and a third control switch for said bottom heater actuable by said thermal retarder, all of said control switches being closed when the tank is full of cold water and both said thermal control switches for the top and the bottom heater being open to deenergize both said heaters when the tank is full of hot water and said control switch actuable by said thermal retarder being closed thereby a predetermined period of time after entry of a predetermined quantity of cold water into the bottom of the tank.

5. A water heating system for a domestic hot water tank having electric heaters at the top and at the bottom end portion of the tank, said system adapted for connection to an electric supply circuit having low load output after noon and during late night hours, said system including a thermally-actuable heater control switch for the top heater subject to the temperature of the water in the top end portion of the tank and effective to cause energization of said top heater at any time in case the top portion of the tank is filled with cold water, a thermal retarder on the tank intermediate the ends of the tank and including a control switch for the bottom heater and a thermally-actuable control switch for the bottom heater subject to the temperature of the water in the bottom portion of the tank, said two control switches for the bottom heater being jointly effective to cause energization of said bottom heater also in case of filling the tank with cold water.

6. A water heating system for a domestic hot water tank having electric heaters at the top and at the bottom end portion of the tank, said system adapted for connection to an electric supply circuit having low load output after noon and during late night hours, said system including a thermally-actuable heater control switch for the top heater subject to the temperature of the water in the top end portion of the tank and effective to cause energization of said top heater at any time in case the top portion of the tank is filled with cold water and to cause deenergization of said top heater when the top portion of the tank is filled with hot water, a thermal retarder unit on the tank intermediate the ends thereof and including a control switch for the bottom heater and a thermally-actuable control switch for the bottom heater subject to the temperature of the water in the bottom portion of the tank, said two control switches for the bottom heater being jointly effective to cause energization of said bottom heater, in case of use of a predetermined quantity of hot water in the morning and in the evening, with a period of time delay to bring said energization in the afternoon and the late night period.

7. A water heating system for a domestic hot water tank having electric heaters at the top and at the bottom end portion of the tank, said system adapted for connection to an electric supply circuit having low load output after noon and during late night hours, said system including a thermally-actuable heater control switch for the top heater subject to the temperature of the water in the top end portion of the tank and effective to cause energization of said top heater at any time in case the top portion of the tank is filled with cold water and to cause deenergization of said top heater when the top portion of the tank is filled with hot water, a thermal retarder on the tank intermediate the ends thereof and including a control switch for the bottom heater and a thermally-actuable control switch for the bottom heater subject to the temperature of the water in the bottom portion of the tank, said two control switches for the bottom heater being jointly effective to cause energization of said bottom heater, in case of use of a predetermined quantity of hot water in the evening, with a period of time delay to bring said energization in the late night period.

8. A water heating system for a domestic hot water tank subject to withdrawals of varying quantities of hot water therefrom during a twenty-four hour day, said system comprising a top and a bottom electric heater, a thermally-actuable control switch for said top heater subject to tank water temperature in the top of the tank, a thermally-actuable control switch for the bottom heater subject to tank water temperature in the bottom of the tank and a thermal retarder unit mounted on the tank intermediate the ends thereof and including a control switch for the bottom heater, said thermal retarder being controlled by tank water temperature intermediate the ends of the tank and by the thermally actuable control switch for the bottom heater, said top heater and its control switch tending to maintain a predetermined quantity of hot water in the top of the tank in case of withdrawal of large quantities of hot water from the tank and said bottom heater control switch and said thermal retarder control switch being jointly effective to cause energization of said bottom heater a predetermined period of time after withdrawal of small quantities of hot water from the tank.

9. A water heater system comprising a tank having a cold water inlet at the bottom portion of the tank, a hot water outlet at the top portion of the tank, electric heaters for the top and bottom portions of the tank, thermally-actuable control means responsive to the temperature of the water in the top portion, the bottom portion and an intermediate portion of the tank for controlling said heaters so that when only a small quantity of hot water is drawn off heat is applied only to the bottom portion of the tank with a predetermined period of time delay after such draw-off but in case substantially all of the hot water is drawn off, heat is applied simultaneously to both the top and the bottom portions of the tank.

10. A water heater system for a domestic tank having a cold water inlet at the bottom of the tank, a hot water outlet at the top of the tank and subject to withdrawals of hot water therefrom during the day and having an electric heater for the upper end portion of the tank, an electric heater for the lower end portion of the tank, an upper thermal switch for controlling the energization of said upper heater and subject to tank water temperature at the upper end portion of the tank, a lower thermal switch for controlling the energization of said lower heater and subject to tank water temperature at the lower end portion of the tank and a thermal retarder switch unit mounted on the tank intermediate the ends thereof and jointly effective with said lower thermal switch to control the energization of said lower heater and comprising a first thermally-expansible element subject to tank water temperature, a second thermally-expansible element out of close thermal communication with said tank water temperature, a heating coil for said second element controlled by said lower switch and a switch controlled by said two elements, said system being effective to cause energization of said lower heater only with an adjustably predetermined time period of delay in case of use of only a relatively small amount of hot water from the tank, to cause immediate energization of said lower heater only in case of use of a predetermined relatively large quantity of hot water from the tank and to cause immediate energization of both heaters in case of use of substantially all of the hot water in the tank.

11. A system as set forth in claim 4 and including means for varying said predetermined period of time.

12. A system as set forth in claim 4 and including manually-actuable means for varying said predetermined period of time.

13. A system as set forth in claim 8 and including means for varying said predetermined period of time.

14. A system as set forth in claim 8 and including manually-actuable means for varying said predetermined period of time.

CLARK M. OSTERHELD.